Sept. 19, 1944.     S. A. AYRES     2,358,616
FUEL OIL FEEDING DEVICE
Filed July 16, 1941
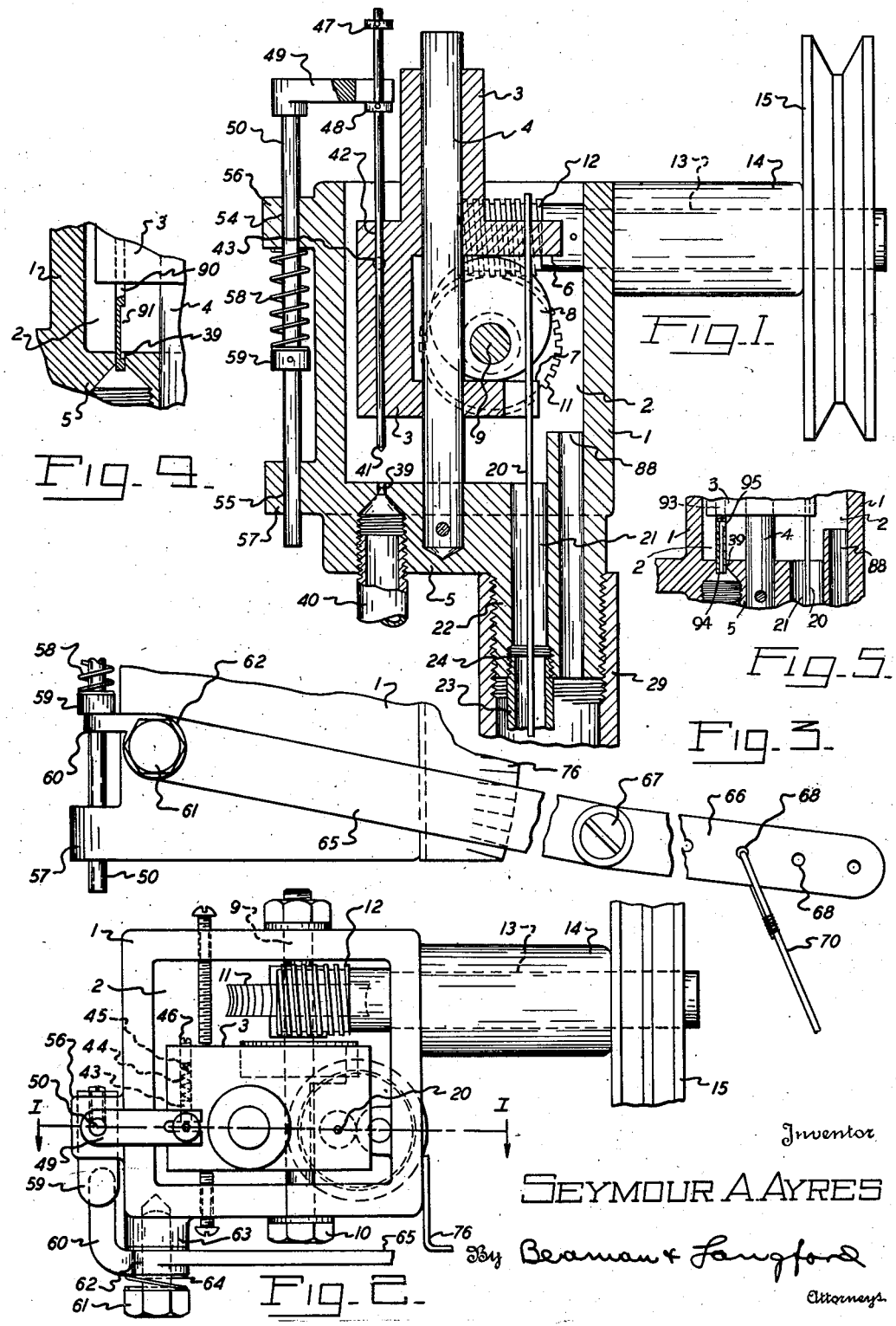

Patented Sept. 19, 1944

2,358,616

UNITED STATES PATENT OFFICE 2,358,616

FUEL OIL FEEDING DEVICE

Seymour A. Ayres, East Lansing, Mich.

Application July 16, 1941, Serial No. 402,636

5 Claims. (Cl. 137—21)

The present invention relates to fuel oil feeding devices and more particularly to such feeding devices adapted for feeding used crankcase oil or other oils having a large proportion of impurities.

The structure of the present invention broadly comprises a chamber to which fuel oil is pumped and which is provided with an overflow outlet to maintain a constant level of fuel oil therein. Disposed in the bottom of the chamber is an opening through which oil is fed to a burner by gravity. The amount of oil flowing through the opening is controlled by a reciprocating pin movable into and out of the opening, the pin being so adjustable that the span of movement of the end of the pin may be varied with respect to the opening, with the result that the relative time that the pin is within the opening and is out of the opening varies the rate at which fuel flows through the opening.

An object of the invention is to provide a structure for feeding fuel which comprises a gravity flow opening into and out of which a pin is reciprocated.

Another object of the invention is to provide a gravity flow opening through which a liquid flows, associated with a pin reciprocating in and out of the opening, and means for adjusting the span of movement of the end of the pin with respect to the opening for adjusting the flow of liquid through the opening.

These and other objects residing in the arrangement, combination and construction of the parts will be apparent from the following specification when taken with the accompanying drawing, in which Fig. 1 is a section of the line I—I of Figure 2, Fig. 2 is a plan view of the feeding unit, Fig. 3 is a side elevation of a detail illustrating the fuel feed adjustment, Fig. 4 is a view corresponding to a partial section of Fig. 1, showing an alternative form of the invention, and Fig. 5 is a view corresponding to Fig. 4, showing still another form of the invention.

Referring particularly to the drawing, the reference character 1 indicates a housing having a chamber 2 therein. Within the chamber 2 is disposed a member 3 mounted for reciprocation on a rod 4 supported in the bottom 5 of the housing 1. The member 3 is provided with vertically spaced faces 6 and 7, between which is disposed an eccentric 8 mounted on a rotating shaft 9, which is in the form of a bolt 10, extending through the housing 1, as shown particularly in Fig. 2. Also mounted on the shaft 9 is a worm gear 11 meshing with a worm wheel 12. The worm wheel 12 is mounted on a shaft 13, rotatable in a boss 14 comprising an integral extension of the housing 1. On the outer end of the shaft 13 is provided a pulley 15 from which the shaft 13 is driven.

Secured to the member 3 is a pump piston rod 20 extending downwardly through a bore 21 in a boss 22 at the bottom of the housing 1. A tube 23 is threaded into the boss 22 at 24 to comprise extension of the bore 21. The piston rod 20 is connected to suitable pumping means, not shown.

The housing 1 is provided at the bottom thereof with an opening 39 providing a communication between the chamber 2 and a fuel oil feed pipe 40. The pipe 40 is threaded into the housing 1 and is provided for conducting fuel oil to a suitable burner, not shown. Fuel oil flows from the chamber 2 through the opening 39 by gravity, but the flow is interrupted by a pin 41 carried by the reciprocable member 3 and movable into and out of the opening 39 as the member 3 reciprocates.

The pin 41 is disposed in a bore 42 in the member 3 and is resiliently held therein by a friction plug 43 disposed in a bore 44 and the member 3 communicating with the bore 42 and yieldably urged against the pin 41 by a spring 45 in the bore 44. The spring 45 is held within the bore 44 and under tension by a screw 46.

The rate of flow of fuel oil through the opening 39 is controlled by the relative position of the pin 41 in the member 3. To adjust the relative position of the pin 41 in the member 3, the pin 41 is provided with spaced stops 47 and 48 above the point where the pin 41 extends out of the chamber 2. Extending between the stops 47 and 48 is a bifurcated arm 49, mounted at the top of a rod 50, the pin 41 being disposed between the bifurcations of the arm 49.

The rod 50 is vertically reciprocable in bores 54 and 55 in bosses 56 and 57 respectively extending from one side of the housing 1. A spring 58 is disposed about the rod 50 beneath the boss 56 and above a stop 59 on the rod 50. The stop 59 is positioned to maintain a spring 58 under tension so that the bifurcated arm 49 is normally urged downwardly.

Opposing downward movement of the rod 50 is a finger 60 shown particularly in Figs. 2 and 3, extending beneath the stop 59. The finger 60 is pivoted about a screw 61 projecting through a boss 62 on the finger 60 and into a boss 63 extending laterally from one side of the housing 1. A spring 64 is disposed between the head of the screw 61 and the boss 62 to resiliently maintain the finger in any position to which it is adjusted. Extending laterally from the boss 62 is an integral arm 65 having a pivotal connection with an arm 66, the arms 65 and 66 being clamped together by a bolt 67 and being capable of angular adjustment with respect to each other. The arm 66 is provided with a plurality of holes 68, through any one of which may be connected one end of an adjustment rod or wire 70.

Associated with the housing 1, adjacent to the arm 65, is a graduated segment 76 for indicating the rotative position of the arm 65 about the screw 61. It will be understood that as the arm 65 is swung about the screw 61 the finger 60 is adjusted up and down to adjust the vertical positon of the bifurcated arm 49 with respect to the stops 47 and 48 on the rod 41 to determine the relative position of the rod 41 with respect to the reciprocable member 3.

A suitable motor drives the shaft 13 to rotate the eccentric 8 to vertically reciprocate the member 3 on the rod 4. The reciprocation of the member 3 reciprocates the pump piston rod 20 to actuate the pump plunger 26 to pump oil from within the upstanding pipe 29 into the chamber 2. The chamber 2 is provided with a gravity overflow opening 88 communicating with the upstanding pipe 29 so that a constant level within the chamber 2 is maintained, the level being determined by the level of the entrance to the opening 88. Fuel oil within the chamber 2 flows by gravity through the opening 39 and the rate of flow is controlled by the pin 41 which reciprocates into and out of the opening 39 under the action of the member 3.

The adjustment of the rate of flow is accomplished by moving the bifurcated arm 49 up and down through the action of the arm 65 moving the finger 60 against the stop 59, and the rod 50 carrying the bifurcated arm 49. Assuming the eccentric 8 has moved the reciprocable member 3 into its uppermost position, in this position the stop 48 on the rod 41 is bearing against the underside of the bifurcated arm 49. As the reciprocable member 3 is moved downwardly under the action of the eccentric 8, it moves the rod 41 downwardly to insert it in the hole 39 and thus stop the flow of fuel oil by gravity through the opening 39, and to maintain the gravity flow stopped so long as the pin 41 is within the opening 39. It will be understood that the spacing between the stops 47 and 48 on the pin 41 is equal to the maximum throw of the eccentric 8 plus the vertical height of the arm 49. Thus when the eccentric 8 has moved the reciprocable member 3 to its lowermost position, the stop 47 is adjacent the top of the arm 49. Should it be desired to increase the flow of fuel oil through the opening 39, the arm 49 is moved upwardly so that during the first downward movement of the rod 41 after the adjustment, the stop 47 will strike against the upper side of the member 49 in its higher position, thus limiting the downward travel of the pin 41, the frictional connection between the member 3 and the pin 41 permitting the pin 41 to slide relatively out of the member 3 a distance corresponding to the adjustment of the arm 49. Accordingly, after the indicated adjustent, for each cycle of reciprocation of the member 3, the rod 41 will be out of the opening 39 for a longer proportion of the time than with the adjustment shown in Fig. 1. It will be understood that any variety of adjustments may be made by merely swinging the arm 65. Also, it will be understood that as the pin 41 reciprocates into and out of the opening 39, it will keep the same free of foreign matter, permitting free feeding flow by gravity of fuel oil from the chamber 2. Thus the pin 41 performs the dual function of keeping the feeding opening 39 clear and controlling the rate of flow of fuel oil through the opening 39.

It will be understood if desired the arm 49 may be adjusted to position the pin 41 with respect to the member 3, so that the pin 41 in reciprocating never reciprocates out of the opening 39. In such case, there will be no feeding of fuel oil. If desired, the adjusting arm 65 may be operably connected to a switch to cut off the motor 83 when the fuel feed is stopped. It is preferred that the size of the opening 39 with respect to the diameter of the rod 41 be such that when the rod 41 continuously reciprocates within the opening 39 there will be no flow of fuel oil. However, it is contemplated that the opening may be large enough in diameter so as to permit a predetermined minimum flow of fuel oil, notwithstanding the presence of the pin 41 in the opening 39.

Fig. 4 illustrates another form which the invention may take. In Fig. 4, which corresponds to a portion of Fig. 1 having associated therewith an alternative embodiment of the invention, a rod 90 is employed in the place of the pin 41. The rod 90 reciprocates in the opening 39 and is provided with a slot 91 in the side thereof. The slot 91 is shown in its upper position. It will be apparent that as the rod 90 moves downwardly the slot 91 will open a passage through the opening 39 to permit the flow of liquid therethrough. However, it will be appreciated that the form of the invention disclosed in Fig. 4 is not particularly adaptable to feeding where dirty liquids are used, since the cleaning action provided by the pin 41 is not present.

Still another form that the invention may take is disclosed in Fig. 5, corresponding to Fig. 4, but disclosing another type of rod that may be substituted for the pin 41 of Fig. 1. A rod 93 reciprocates in the opening 39 and is provided with a longitudinally extending port 94 having an opening 95 through the side of the rod 93. The port 94 also opens through the bottom of the rod 93. It will be apparent that as the rod 93 is reciprocated, the opening 95 will move into and out of the liquid in the chamber 2, the level of the liquid in the chamber 2 being determined by the overflow opening 88. Thus whenever the opening 95 is below the surface of the liquid in the chamber 2, the liquid will flow downwardly through the port 94 and through the opening 39. With the construction disclosed in Fig. 5, like that disclosed in Fig. 4, dirty liquid should not be used, for the reason that there is no cleaning action as provided by the pin 41 in the form of the invention disclosed in Fig. 1.

While the invention has been described as being for feeding fuel oil, it will be understood that it may be employed for feeding any liquid. Furthermore, it is intended that the term "liquid" in the claims be construed broadly enough to include any freely flowing substance, whether it be strictly a liquid or not. Also broadly it is considered that the invention contemplates other structures than the specific reciprocating pin shown.

Having thus described my invention, what I desire to secure by Letters Patent and claim is:

1. A device of the character described comprising a liquid chamber, a gravity flow liquid opening therefrom, a pin having an end reciprocable into and out of said opening for controlling the flow of liquid from said chamber, a member in said chamber mounted for reciprocation, an externally driven eccentric in said chamber arranged to reciprocate said member, an operating connection between said pin and said member for periodically axially reciprocating said pin relatively to said liquid opening, and means to adjust the operative connection between said pin and member to vary the span of movement of said end with respect to said opening for adjusting the flow of liquid from said opening.

2. A device of the character described comprising a liquid chamber, a gravity flow opening therefrom, a pin having an end reciprocable into and out of said opening for controlling the flow of liquid from said chamber, a periodically reciprocable member, means frictionally securing said pin to said member for reciprocation therewith, stop means on said pin, and means associated with said stop means to adjust the position of said pin with respect to said member as said member reciprocates to adjust the span of movement of said end with respect to said opening, for adjusting the flow of liquid from said opening.

3. A device of the character described comprising a liquid chamber, a gravity flow opening therefrom, a pin having an end reciprocable into and out of said opening for controlling the flow of liquid from said chamber, a reciprocable member, a bore in said member in which said pin is slidably disposed, means for frictionally restraining the sliding movement of said pin in said bore, means for periodically reciprocating said member to reciprocate said pin relatively to said opening, and means to adjust the axial relation of said pin to said bore to adjust the span of movement of said end with respect to said opening, for adjusting the flow of liquid from said opening.

4. A device of the character described comprising a liquid chamber, a gravity flow opening therefrom, a pin having an end reciprocable relative to said opening for controlling the flow of liquid from said chamber, a periodically reciprocable member, means frictionally securing said pin to said member at adjustable positions along the length of said pin and for reciprocation therewith, fixed stop means on said pin, a lever, and an operative connection between said lever and said stop means to adjust said pin relative to said member, by said lever, to vary the span of movement of said end with respect to said opening for adjusting the flow of liquid from said opening.

5. A device of the character described comprising a liquid chamber, a gravity flow opening therefrom, a pin having an end reciprocable into and out of said opening for controlling the flow of liquid from said chamber, a periodically reciprocable member, means frictionally securing said pin to said member for reciprocation therewith, stop means on said pin, an axially slidable rod, a member connected to said rod extending into the path of said stop means to define the limits of movement of said pin from one frictionally engaged position to another as said member reciprocates to adjust the span of movement of said end with respect to said opening for adjusting the flow of liquid from said opening, and means to axially adjust said rod.

SEYMOUR A. AYRES.